US009142248B2

(12) United States Patent
Otaguro

(10) Patent No.: US 9,142,248 B2
(45) Date of Patent: Sep. 22, 2015

(54) MOTOR DRIVE DEVICE, MAGNETIC DISK STORAGE DEVICE, AND ELECTRONIC DEVICE

(71) Applicant: ROHM CO., LTD., Kyoto-shi, Kyoto (JP)

(72) Inventor: Yoshito Otaguro, Kyoto (JP)

(73) Assignee: ROHM CO., LTD. (JP)

( * ) Notice: Subject to any disclaimer, the term of this patent is extended or adjusted under 35 U.S.C. 154(b) by 239 days.

(21) Appl. No.: 13/857,595

(22) Filed: Apr. 5, 2013

(65) Prior Publication Data

US 2014/0300992 A1 Oct. 9, 2014

(51) Int. Cl.

| | |
|---|---|
| ***G11B 19/20*** | (2006.01) |
| ***H02P 6/14*** | (2006.01) |
| ***H02P 25/02*** | (2006.01) |
| ***H02P 6/08*** | (2006.01) |
| ***G11B 19/00*** | (2006.01) |
| ***G11B 19/28*** | (2006.01) |
| ***H02P 3/08*** | (2006.01) |

(52) U.S. Cl.

CPC ............ *G11B 19/2081* (2013.01); *G11B 19/00* (2013.01); *G11B 19/28* (2013.01); *H02P 3/08* (2013.01); *H02P 6/08* (2013.01); *H02P 6/14* (2013.01); *H02P 25/028* (2013.01)

(58) Field of Classification Search

None

See application file for complete search history.

(56) References Cited

U.S. PATENT DOCUMENTS 6,639,373 B2 * 10/2003 Knight et al. .................. 360/75
7,057,841 B2 * 6/2006 Takayanagi et al. ............ 360/69
7,557,557 B2 * 7/2009 Sugie et al. .................. 323/316
7,701,686 B2 * 4/2010 Kato et al. .................. 361/93.1
7,924,542 B2 * 4/2011 Takahashi et al. ........... 361/93.1
7,960,997 B2 * 6/2011 Williams ................. 324/762.09
8,432,775 B2 * 4/2013 Miyagoe et al. ................ 360/69
8,749,222 B2 * 6/2014 Williams .................. 324/76.11
2007/0103005 A1 * 5/2007 Nagasawa et al. ............ 307/125
2010/0315738 A1 12/2010 Yamashita et al.
2014/0285178 A1 * 9/2014 Williams .................. 324/76.11

FOREIGN PATENT DOCUMENTS

JP 2005-269808 A 9/2005
JP 2010-288425 A 12/2010

* cited by examiner

*Primary Examiner* — Wayne Young
*Assistant Examiner* — James L Habermehl
(74) *Attorney, Agent, or Firm* — Cantor Colburn LLP

(57) ABSTRACT

A motor drive device has a spindle motor driver adapted to receive electric power from a power supply line to drive a spindle motor; an isolation switch adapted to connect and disconnect an application terminal of a power supply voltage to and from the power supply line, and a current monitor adapted to monitor a first current flowing into the isolation switch. The current monitor includes a mirror switch arranged to connect a first terminal of the mirror switch to the application terminal of the power supply voltage and adapted to be turned on and off by the same control signal as the isolation switch; a bias generator adapted to bias a second terminal of the mirror switch to the same voltage as the power supply line; a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal.

16 Claims, 11 Drawing Sheets

MOTOR DRIVE DEVICE, MAGNETIC DISK STORAGE DEVICE, AND ELECTRONIC DEVICE

BACKGROUND OF THE INVENTION

1. Field of the Invention

The invention described in this specification relates to a motor drive device.

2. Description of Related Art

As examples of a technology related to a motor drive device, there are JP-A-2010-288425 (patent document 1) and JP-A-2005-269808 (patent document 2).

However, a conventional motor drive device (particularly, a system motor driver LSI for a HDD [hard disk drive] controller) leaves room for improvement as to at least power-saving of an internal regulator, reliability improvement of a motor brake system at the time of power shutdown, or a current detecting method of a motor driver.

SUMMARY OF THE INVENTION

A subject of the present invention described in the present specification is to solve the above-described problems found by the present applicant.

In the invention described in the present specification, a motor drive device according to a first invention has a motor driver adapted to receive a first power supply voltage to drive a motor; an internal regulator adapted to generate from an input voltage an internal power supply voltage; and a power supply switcher adapted to receive both the first power supply voltage and a second power supply voltage lower than the first power supply voltage to output, as the input voltage, the second power supply voltage when the second power supply voltage is normal and to output, as the input voltage, the first power supply voltage when the second power supply voltage is abnormal.

Besides, in the invention described in the present specification, a motor drive device according to a second invention has a spindle motor driver adapted to drive a spindle motor; wherein the spindle motor driver includes lower side NMOSFETs, one for each phase, which connect and disconnect terminals, one for each phase, of the spindle motor to and from a ground terminal; a controller adapted to generate a switch control signal and a brake control signal; lower side pre-drivers, one for each phase, connected between an application terminal of an internal power supply voltage and the ground terminal and adapted to generate lower side gate signals, one for each phase, in accordance with the switch control signal to output the lower side gate signals to the lower side NMOSFETs, one for each phase; and a brake unit adapted to pull up to the internal power supply voltage all the lower side gate signals, one for each phase, in accordance with the brake control signal.

Besides, in the invention described in the present specification, a motor drive device according to a third invention has a spindle motor driver adapted to receive electric power from a power supply line to drive a spindle motor; an isolation switch adapted to connect and disconnect an application terminal of a power supply voltage to and from the power supply line, and a current monitor adapted to monitor a first current flowing into the isolation switch; wherein the current monitor includes a mirror switch arranged to connect a first terminal of the mirror switch to the application terminal of the power supply voltage and adapted to be turned on and off by the same control signal as the isolation switch; a bias generator adapted to bias a second terminal of the mirror switch to the same voltage as the power supply line; a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal.

Here, as to the invention described in present specification, other features, elements, steps, advantages and characteristics of the present invention will become more apparent from the following detailed description of preferred embodiments of the present invention and the attached drawings.

DETAILED DESCRIPTION OF PREFERRED EMBODIMENTS

<Motor Drive Device>

Figure 1:
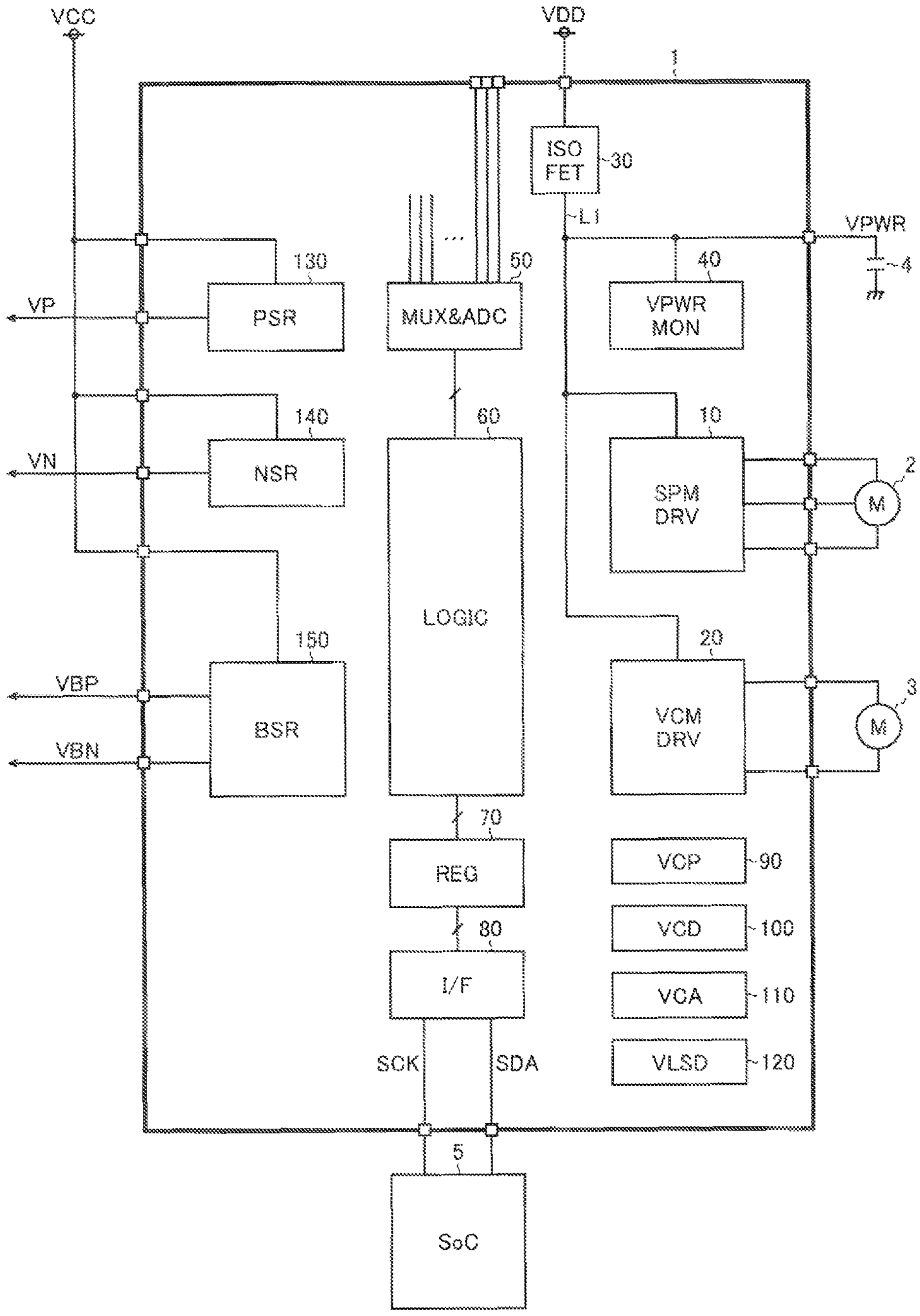
FIG. 1 is a block diagram showing a structural example of a motor drive device.

FIG. 1 is a block diagram showing a structural example of a motor drive device. The motor drive device 1 of this structural example is a monolithic semiconductor integrated circuit device (i.e., a system motor driver LSI) which performs drive control of a spindle motor 2 and a voice coil motor 3 used in a hard disk drive: has a spindle motor driver 10; a voice coil motor driver 20; an insulation switch 30; a power voltage monitor 40; A/D converter 50; a logic unit 60; a register 70; serial interface 80; a charge pump 90; an internal regulator 100, 110 and 120, a step-down switching regulator 130; an inverting switching regulator 140; and step-up switching regulator 150.

Besides, the motor drive device 1 has various kinds of sensor detection circuits to monitor an output of an external sensor (a shock sensor, a pressure sensor, a temperature sensor, and so on) except the above-mentioned structural elements. Here, the whole structure of the hard disk drive that incorporates the motor drive device 1 are illustrated below in detail.

A power supply voltage VDD (e.g., 12V) is applied from a host of an external device to a power supply line L1 of a motor drive system as a power voltage VPWR for driving the spindle motor 10 and the voice coil motor driver 20. Here, a capacitor 4 for smoothing the power voltage VPWR is provided in the form of an external component to the power supply line L1.

The spindle motor driver 10 is connected to the power supply line L1, and rotates a platter (a magnetic disk) at predetermined rotation speeds by rotating the spindle motor 2 (e.g., a 3-phase brushless DC motor in the present structural example) with the power supply voltage VDD when the power supply voltage is normal. On the other hand, the spindle motor driver 10 rectifies phase voltages, one for each phase, generated during idling of the spindle motor 2, and regenerates rectified phase voltages to the power supply line L1 as the power voltage VPWR when the power supply voltage VDD is abnormal (e.g., power supply interruptions, instantaneous power failure, and so on). The power voltage VPWR is provided for relevant parts (e.g., the voice coil motor 20 etc.) of the motor drive device 1 via the power supply line L1.

The voice coil motor driver 20 is connected to the power supply line L1, and moves a magnetic head on the platter in a tracking mode by driving the voice coil motor 3 with the power supply voltage VDD when the power supply voltage VDD is normal. On the other hand, the voice coil motor driver 20 drives the voice coil motor 20 with the power voltage VPWR regenerating from the spindle motor driver 10 to the power supply line L1 when the power supply voltage is abnormal. Thus, it is possible to operate the magnetic head automatically to an outside lamp mechanism further than an outermost circumference of the platter. A collision between the magnetic head and the platter is avoidable in advance by possessing such a power off retract function when the power supply voltage VDD is abnormal.

The insulation switch 30 is a backflow prevention element which connects and disconnects a power supply pin (an external terminal to apply the power supply voltage VDD) of the motor driver 1 to and from the power supply line L1. The insulation switch 30 turns on when the power supply voltage VDD is normal, and turns off when the power supply voltage VDD is abnormal. A MOSFET (metal oxide semiconductor field effect transistor), a diode and the like are preferably usable as the insulation switch 30.

The power voltage monitor 40 monitors the power voltage VPWR applied to the power supply line L1 to decide that the power voltage VPWR is normal or abnormal (consequently, to decide that the power supply voltage VDD is normal or abnormal). The decision of the power voltage monitor 40 is used for ON/OFF control of the insulation switch 30, operation mode switch control (switch control of normal mode/rectified regeneration mode) of the spindle motor driver 10, etc.

The A/D converter 50 converts a plurality of analog signals inputted from the inside and the outside of devices into digital signals to output the digital signals to the logic unit 60.

The logic unit 60 controls entire operation of the motor drive device 1 based on various digital signals inputted from the A/D converter 50, various register data read from the register 70, and so on.

The register 70 stores the various register data written from a microcomputer 5 (SoC [system-on chip]) and the logic unit 60 in a volatile manner.

The serial interface 80 performs, for example, serial communication with the microcomputer 5 (a main element controlling entire operation of a hard disk drive) located to the outside of the motor drive device 1 based on a SPI (serial peripheral interface) standard.

The charge pump 90 generates a step-up voltage VCP (e.g., VPWR+5V) by raising the power voltage VPWR in charge pump operation.

The internal regulator 100 generates an internal power supply voltage VCD (e.g., 1.5V) for a digital system by stepping down the power supply voltage VDD (e.g., 12V) or a power supply voltage VCC (e.g., 5V).

The internal regulator 110 generates an internal power supply voltage VCA (e.g., 1.5V) for an analog system by stepping down the power supply voltage VDD or the power supply voltage VCC.

The internal regulator 120 generates an internal power supply voltage VLSD (e.g., 5V) for driving a low side gate by stepping down the step-up voltage VCP.

The step-down switching regulator 130 generates a positive voltage VP (e.g., 0.9V, 1.8V, 2.5V, or 3.3V) by stepping down the power supply voltage VCC. The positive voltage is used as a positive power supply voltage (e.g., a power supply voltage for a core of the microcomputer 5 or a power supply voltage for a memory) of each part of the hard disk drive.

The inverting switching regulator 140 generates a negative voltage VN (e.g., −5V) by inverting the power supply voltage VCC. The negative voltage VN is used as a negative voltage (e.g., a negative power supply voltage for a head amplifier) of each part of the hard disk drive.

The step-up switching regulator 150 generates a positive step-up voltage VBP and a negative step-up voltage VBN (e.g., ±17V) by stepping up the power supply voltage VCC to a positive direction and a negative direction. The positive step-up voltage VBP and the negative step-up voltage VBN are respectively used as a positive and negative power supply voltage (e.g., a positive and negative power supply voltage for a piezoelectric actuator built into the magnetic head) of each part of the hard disk drive.

<Internal Regulator (Power Supply for Digital System/Power Supply for Analog System)>

Figure 2:
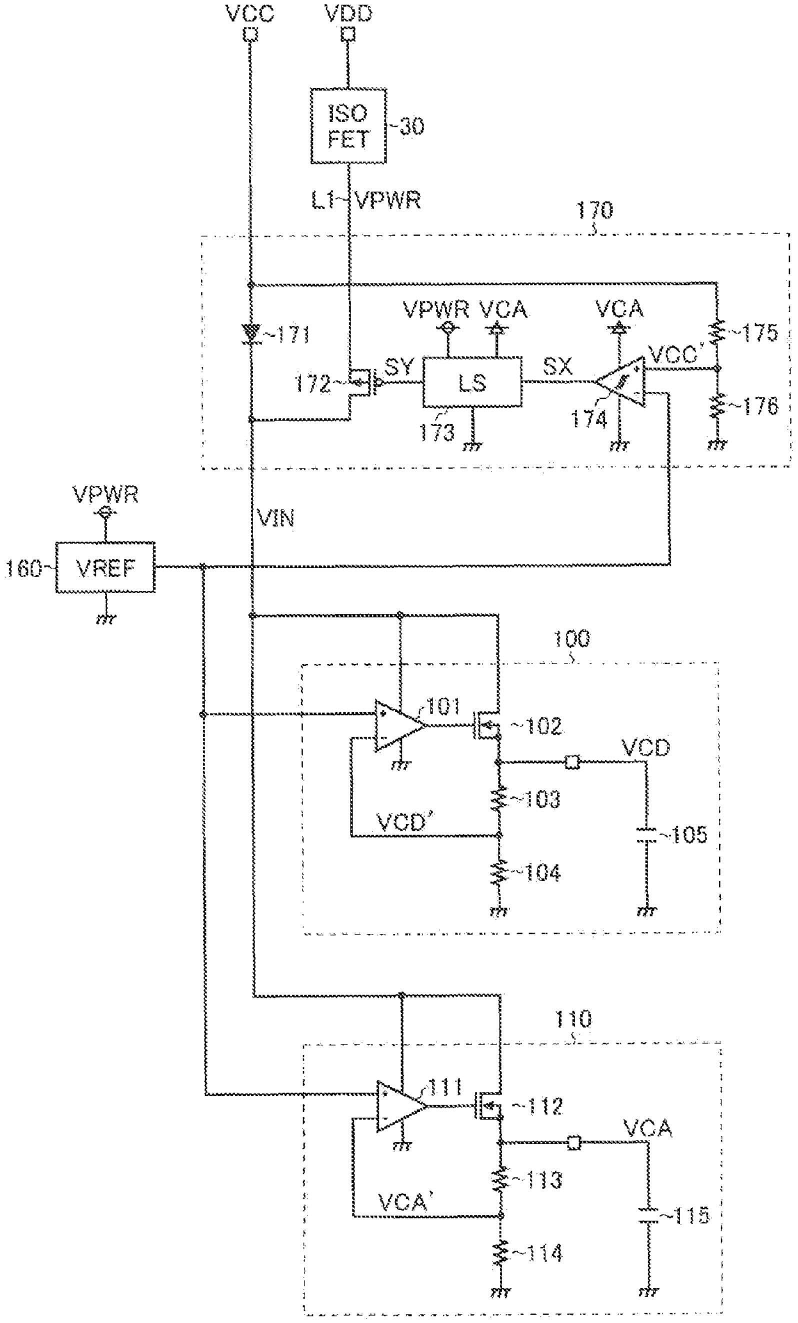
FIG. 2 is a circuit diagram showing a structural example of an internal regulator 100 and 110.

FIG. 2 is a circuit diagram showing a structural example (including a reference voltage generator 160 and a power supply switcher 170 as peripheral blocks) of an internal regulator 100 and 110. The internal regulators 100 and 110 are series regulators for generating the internal power supply voltage VCD and VCA (e.g., 1.5V) by stepping down an input voltage VIN inputted from the power supply switcher 170.

The internal regulator 100 is a circuit block which generates the internal power supply voltage VCD (e.g., 1.5V) for the digital system by stepping down the input voltage VIN, and includes an operational amplifier 101, an NMOSFET 102 (N-channel-type MOSFET), resistors 103 and 104, and a capacitor 105. A non-inverting input terminal (+) of the operational amplifier 101 is connected to an application terminal of a reference voltage VREF (e.g., 1.5V). An output terminal of the operational amplifier 101 is connected to a gate of the NMOSFET 102. A first power supply terminal (a high potential terminal) of the operational amplifier 101 and a drain of the NMOSFET 102 are connected to an application terminal of the input voltage VIN. A second power supply terminal (a low potential terminal) of the operational amplifier 101 is connected to a ground terminal. A source and a back gate of the NMOSFET 102 are connected to an output terminal of the internal power supply voltage VCD; moreover, they are connected to the ground terminal via the resistors 103 and 104. An inverting input terminal (−) of the operational amplifier 101 is connected to a connection node between the resistor 103 and the resistor 104. The capacitor 105 for smoothing an output is provided in the form of an external component between the output terminal of the internal power supply voltage VCD and the ground terminal.

In the above internal regulator 100, the operational amplifier 101 generates a gate voltage of the NMOSFET 102 and adjusts a degree of conduction of the NMOSFET 102 so that the reference voltage VREF applied to the non-inverting input terminal (+) may correspond with a divided voltage VCD' (e.g., VCD'=VCD/3) of the internal power supply voltage VCD applied to the inverting input terminal (−). According to such output feedback control, the internal regulator 100 generates the internal power supply voltage VCD (e.g., VCD=3*VREF=1.5V) in accordance with the reference voltage VREF by stepping down the input voltage VIN.

The internal regulator 110 is a circuit block which generates the internal power supply voltage VCA (e.g., 1.5V) for the analog system by stepping down the input voltage VIN, and includes an operational amplifier 111, an NMOSFET 112, resistors 113 and 114, and a capacitor 115. A non-inverting input terminal (+) of the operational amplifier 111 is connected to the application terminal of the reference voltage VREF. An output terminal of the operational amplifier 111 is connected to a gate of the NMOSFET 112. A first power supply terminal (a high potential terminal) of the operational amplifier 111 and a drain of the NMOSFET 112 are connected to the application terminal of the input voltage VIN. A second power supply terminal (a low potential terminal) of the operational amplifier 111 is connected to the ground terminal. A source and a back gate of the NMOSFET 112 are connected to an output terminal of the internal power supply voltage VCA; moreover, they are connected to the ground terminal via the resistors 113 and 114. An inverting input terminal (−) of the operational amplifier 111 is connected to a connection node between the resistor 113 and the resistor 114. The capacitor 115 for smoothing an output is provided in the form of an external component between the output terminal of the internal power supply voltage VCA and the ground terminal.

In the above internal regulator 110, the operational amplifier 111 generates a gate voltage of the NMOSFET 112 and adjusts a degree of conduction of the NMOSFET 112 so that the reference voltage VREF applied to the non-inverting input terminal (+) may correspond with a divided voltage VCA' (e.g., VCA'=VCA/3) of the internal power supply voltage VCA applied to the inverting input terminal (−). According to such output feedback control, the internal regulator 110 generates the internal power supply voltage VCA (e.g., VCA=3*VREF=1.5V) in accordance with the reference voltage VREF by stepping down the input voltage VIN.

A reference voltage generator 160 includes a bandgap power supply circuit, a resistor divider, and so on. The reference voltage generator 160 generates the reference voltage VREF from the power voltage VPWR.

By the way, the motor drive device 1 should control the drive of the motor (including safe shutdown) as far as the power supply voltage VDD is provided for the power supply line L1 or the power voltage VPWR is regenerated to the power supply line L1 after the power supply voltage VDD is shut down, even if the power supply voltage VCC for a regulator drive system was shut down.

Generally, not the power supply voltage VCC for the regulator drive system but the power supply voltage VDD for the motor drive system or the power voltage VPWR was always provided for the internal regulators 100 and 110 which generate the internal power supply voltages VCD and VCA to control the drive of the motor. However, in such a structure, there is a problem that power consumption of the internal regulators 100 and 110 increases.

To solve the above-mentioned subject, the motor drive device 1 has the power supply switcher 170 which inputs both the power supply voltage VDD (12V) and the power supply voltage VCC (5V) for the regulator drive system lower than the power supply voltage VDD to output, as the input voltage VIN, the power supply voltage VCC when the power supply voltage VCC is normal and to output, as the input voltage VIN, the power supply voltage VDD when the power supply voltage VCC is abnormal. Hereinafter, structure and operation of the power supply switcher 170 are described in detail.

The power supply switcher 170 includes a diode 171, a PMOSFET 172, a level shifter 173, a hysteresis comparator 174, and resistors 175 and 176.

The diode 171 is a backflow prevention element which is connected between an application terminal the power supply voltage VCC and the application of the input voltage VIN. As to specific connection relations, an anode the diode 171 is connected to the application terminal of the power supply voltage VCC. A cathode of the diode 171 is connected to the application terminal of the input voltage VIN.

The PMOSFET 172 is a switch element which is connected between an application terminal of the power supply voltage VDD and the application terminal of the input voltage, and is turned on and off in accordance with an on/off control signal SY (consequently, a comparison signal SX). As to specific connection relations, a source and a back gate of the PMOSFET 172 are connected to the power supply line L1 to which the power voltage VPWR (consequently, the power supply voltage VDD) is applied. A drain of the PMOSFET 172 is connected to the application terminal of the input terminal VIN. A gate of the PMOSFET 172 is connected to an application terminal of the on/off control signal SY (an output terminal of the level shifter 173).

The level shifter 173 operates in response to supply of both the internal power supply voltage VCA and the power voltage VPWR, and generates the on/off control signal SY (high level: VPWR, low level: GND) from the comparison signal SX (high level: VCA, low level: GND).

The hysteresis comparator 174 operates in response to supply of the internal power supply voltage VCA, and generates the comparison signal SX by comparing a divided voltage VCC' (a divided voltage of the power supply voltage VCC) applied to a non-inverting input terminal (+) with the predetermined reference voltage VREF applied to an inverting input terminal (−). Here, the comparison signal SX fall from a high level (a normal logic level) to a low level (a logic level during a failure) when the power supply voltage VCC becomes below a power down detection value VPD (e.g., 3.5V). On the other hand, the comparison signal SX rises from the low level to the high level when the power supply voltage VCC becomes above a power good detection value VPG (e.g., 3.8V).

The resistors 175 and 176 form a resistor divider which generates the divided voltage VCC' by dividing the power supply voltage VCC. As to specific connection relations, a first terminal of the resistor 175 is connected to the application terminal of the power supply voltage VCC. A second terminal of the resistor 175 and a first terminal of the resistor 176 are connected to the non-inverting input terminal (+) of the hysteresis comparator 174. A second terminal of the resistor 176 is connected to the ground terminal.

In the power supply switcher 170 in the present structural example, the on/off control signal SY becomes a high level and the PMOSFET 172 is turned off because the comparison signal SX becomes the high level when the power supply voltage VCC is normal (VCC≥VPG). Consequently, the power supply voltage VCC lower than the power supply voltage VDD is outputted as the input voltage VIN of the internal regulators 100 and 101.

On the other hand, the on/off control signal SY becomes a low level and the PMOSFET 172 is turned on because the comparison signal SX becomes the low level when the power supply voltage VCC is abnormal (VCC≤VPG). Consequently, the power supply voltage VDD is outputted as the input voltage VIN of the internal regulators 100 and 101. In the above-mentioned case, a backflow current does not flow from the application terminal of the input voltage VIN toward the application terminal of the power supply voltage VCC because the diode 171 becomes a reverse bias state.

According to the power supply switcher 170 in the present structural example, it is possible to provide the internal regulators 100 and 110 with the power supply voltage VCC for the regulator drive system lower than the power supply voltage VDD for the motor drive system as far as the power supply voltage VCC is normal. Therefore, it is possible to achieve reduction of the power consumption (about 60%) in comparison with a conventional structure that always provide the internal regulators 100 and 110 with the power supply voltage VDD for the motor drive system.

The power supply voltage VCC for the regulator drive system is basically applied to the internal regulators 100 and 110, however, there is also a situation where the power supply voltage VDD for the motor drive system is applied to the internal regulators 100 and 110. In view of these situations, it is necessary to give breakdown voltage of semiconductor elements which can also withstand the power supply voltage VDD for the motor drive system to circuit elements which forms the internal regulators 100 and 110.

<Spindle Motor Driver>

Figure 3:
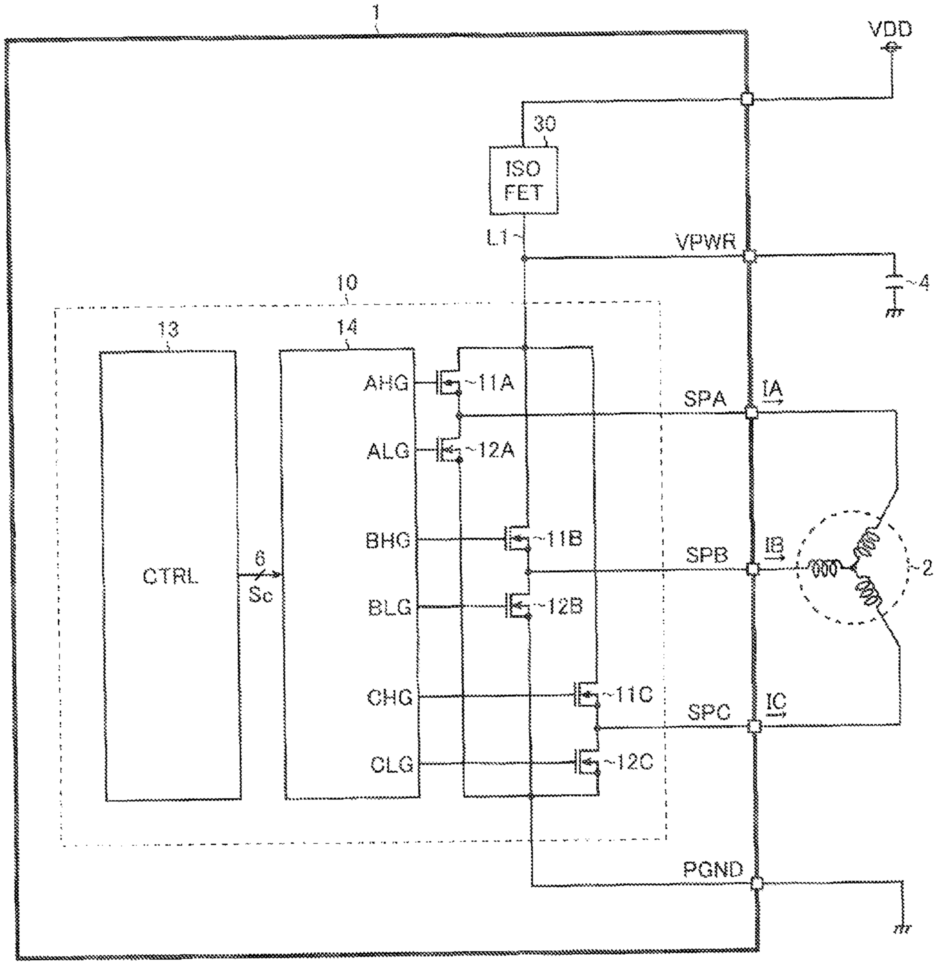
FIG. 3 is a block diagram showing a structural example of a spindle motor driver 10.

FIG. 3 is a block diagram showing a structural example of a spindle motor driver 10. The spindle motor driver 10 includes upper side switches 11*x* (where x=A, B, C; the same below), lower side switches 12*x*, a controller 13, and a pre-driver unit 14.

The upper side switches 11*x* are switch elements (NMOSFETs) which connect and disconnect terminals, one for each phase, of the spindle motor 2 to and from an application terminal of the power voltage VPWR (the power supply line L1). The upper side switches 11*x* turn on when upper side gate signals xHG are at a high level, and turn off when the upper side gate signals xHG are at a low level. Here, PMOSFETs (P-channel type MOSFETs) are also usable as the upper side switches 11*x*.

The lower side switches 12*x* are switch elements (NMOSFETs) which connect and disconnect terminals, one for each phase, of the spindle motor 2 to and from an application terminal of a ground voltage PGND. The lower side switches 12*x* turn on when lower side gate signals xLG are at a high level, and turn off when the lower side gate signals xLG are at a low level.

The controller 13 generates a switch control signal Sc (upper side 3-phase and lower side 3-phase, a total of 6 channels) so as to rotate the spindle motor 2 at predetermined rotation speeds when the power supply voltage VDD is normal. On the other hand, the controller 13 generates the switch control signal Sc so as to rectify phase voltages SPx generated during idling of the spindle motor 2 when the power supply voltage VDD is abnormal.

The pre-driver 14 generates the upper side gate signals xHG and the lower side gate signals xLG so as to turn on/off the upper side switches 11*x* and the lower side switches 12*x* in accordance with the switch control signal Sc inputted from the controller 13.

<Brake Unit>

Figure 4:
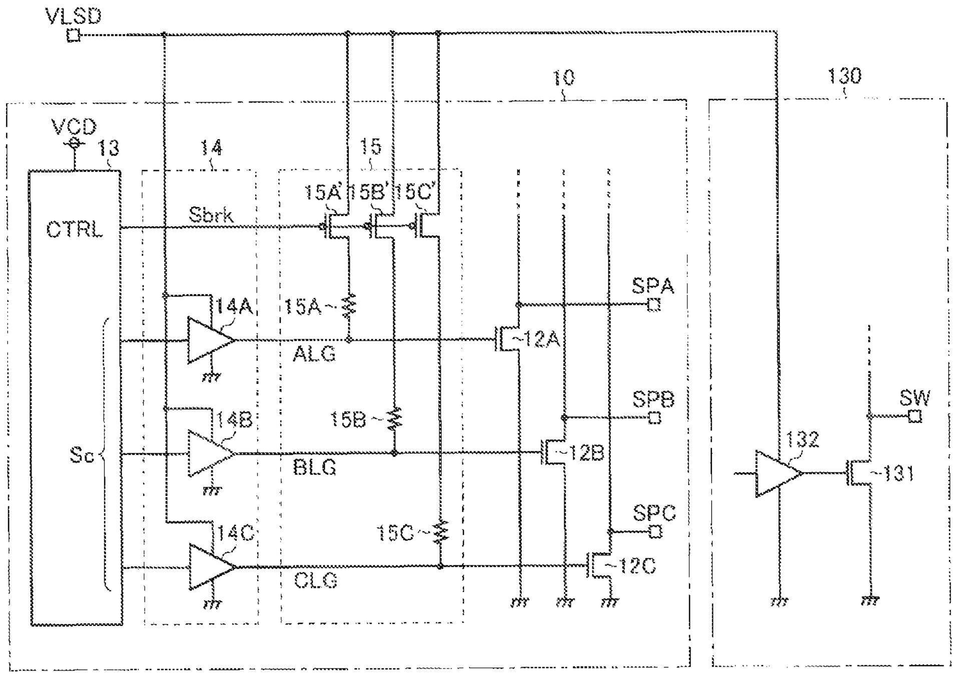
FIG. 4 is a circuit diagram showing a structural example of a brake unit 15.

FIG. 4 is a circuit diagram showing a structural example of a brake unit 15 built into the spindle motor driver 10. In the spindle motor driver 10 in the present structural example, the above-mentioned pre-driver 14 is connected between an application terminal and a ground terminal of an internal power supply voltage VLSD (e.g., 5V), and includes lower side pre-drivers 14*x* which generate the lower side gate signals xLG (where x=A, B, C; the same below) in accordance with the switch control signal Sc to output the lower side gate signals xLG to the lower side switches 12*x*. Besides, the pre-driver 14 also includes upper side pre-drivers which generate the upper side gate signals xHG in accordance with the switch control signal Sc to output the upper side gate signals xHG to the upper side switches 11*x*.

The brake unit 15 is a circuit block which pulls up the lower side signals xLG to the internal power supply voltage VLSD in accordance with a brake control signal Sbrk inputted from the controller 13, and includes pull-up resistors 15*x* and PMOSFETs 15*x*'. The pull-up resistors 15*x* are connected between the application terminal of the internal power supply voltage VLSD and gates of the lower side switches 12*x*. The PMOSFETs 15*x*' are brake switches which connect and disconnect the application terminal of the internal power supply voltage VLSD to and from the pull-up resistors 15*x* in accordance with the brake control signal Sbrk. As to specific connection relations, sources of the PMOSFETs 15' are connected to the application terminal of the internal power supply voltage VLSD. Drains of the PMOSFETs 15' are connected to the gates of the lower side switches 12*x* via the pull-up resistors 15*x*. Gates of the PMOSFETs 15' are connected to an application terminal of the brake control signal Sbrk. The PMOSFETs 15' turn off when the brake control signal Sbrk is at a high level, and turn on when the brake control signal Sbrk is at a low level.

Power off retract operation of the magnetic head by the voice coil motor 20 is executed when the power supply voltage VDD is shut down. The spindle motor driver 10 controls a brake of the spindle motor 2 (i.e., a final brake) to stop a rotation of the magnetic disk safely after completion of the power off retract operation. Specifically, the spindle motor driver 10 turns off the upper side switches 11*x*, and turns on the lower side switches 12*x*.

At that time, under a state where the power supply voltage VDD is shut down, it is necessary to hold the lower side gate signals xLG at a high level certainly by using residual charge stored in the capacitor for smoothing the internal power supply voltage VLSD in order to turn on the lower side switches 12*x* during several seconds.

Therefore, the brake unit 15 which consists of the above-mentioned structure is built into the spindle motor 10 in the present structural example. The controller 13 generates the switch control signal Sc so as to bring the lower side pre-drivers 14*x* to an output high impedance state when applying a brake to the spindle motor 2, and also drops the brake control signal to the low level so as to pull up the gates of the lower side switches 12*x* to the internal power supply voltage VLSD.

Here, the internal power supply voltage VLSD is provided for not only the lower side pre-drivers 14*x* which drive the lower side switches 12*x* of the spindle motor driver 10 but also a lower side pre-drivers 132 which drive a lower side switch 131 of the step-down switching regulator 130. However, the lower side pre-drivers 14*x* of the spindle motor driver 10 is brought to the output high impedance state during the final brake. The lower side pre-driver 132 of the step-down switching regulator 130 is brought to the output low level state before the final brake. Accordingly, the internal regulator 120 which generates the internal power supply voltage VLSD is not connected to a DC load at all during the final brake.

According to such a structure, it is possible to turn on the lower side switches 12*x* during several seconds if the power supply voltage VDD is shut down because the residual charge stored in the capacitor for smoothing the internal power supply voltage VLSD is available for only the pull-up of the lower side switches 12*x*.

As the above description, the internal power supply voltage VCD provided for the controller 13 is switched to a state generated not from the power supply voltage VCC but from the power voltage VPWR when the power supply voltages VDD and VCC are shut down. The power voltage VPWR becomes 0V and the internal power supply voltage VCD is also 0V when applying a brake to the spindle motor 2 because the power voltage VPWR is generated by rectifying back electromotive force generated during idling of the spindle motor 2. Therefore, the controller 13 can't generate the switch control signal Sc and the brake control signal Sbrk (i.e., all output signals become a low level.) after the final brake.

However, it is possible to hold an on state by the brake control signal Sbrk of the low level if supply of electric power is suspended to the controller 13 because the brake unit 15 in the present structural example uses the PMOSFETs 15*x*' as the brake switches which connect and disconnect the application terminal of the internal power supply voltage VLSD to and from the pull-up resistors 15*x*. Accordingly, it is possible to hold the pull-up of the gates of the lower side switches 12*x* until the internal power supply voltage VLSD drops to about 0V.

<Internal Regulator (Power Supply for Lower Side Gate)>

Figure 5:
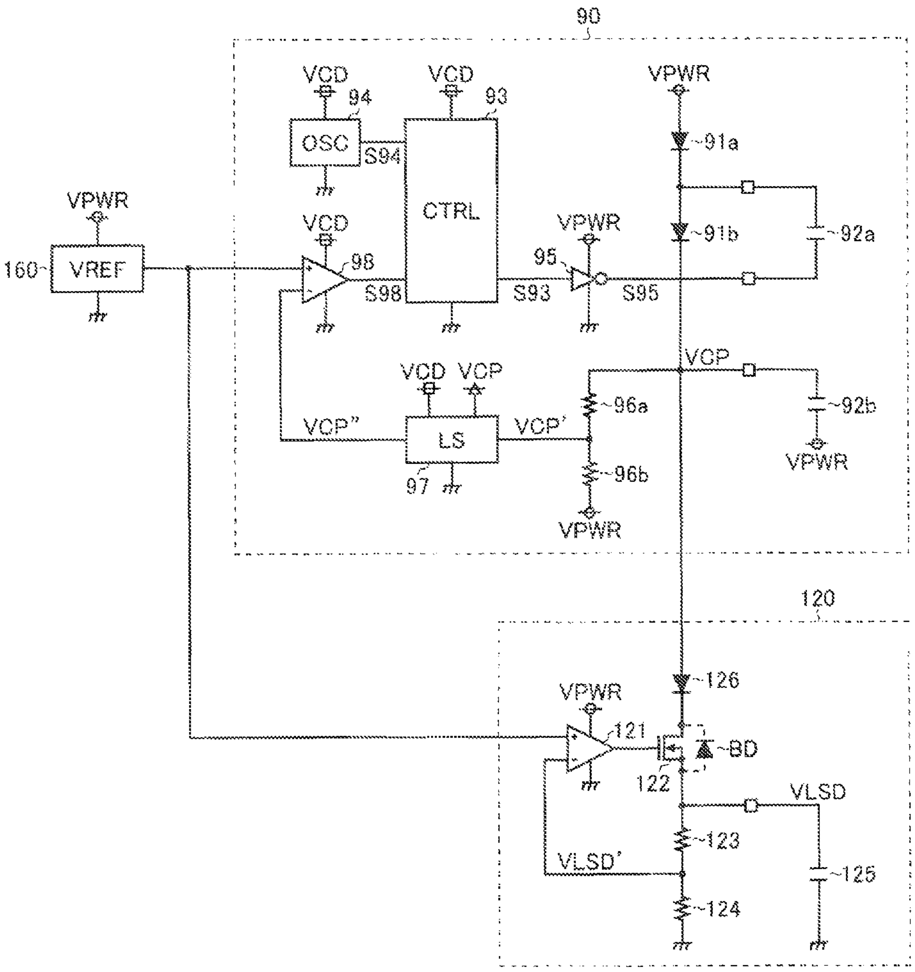
FIG. 5 is a circuit diagram showing a structural example of a charge pump 90 and an internal regulator 120.

FIG. 5 is a circuit diagram showing a structural example of a charge pump 90 and an internal regulator 120. The charge pump 90 is a circuit block which receives the power voltage VPWR from the power supply line L1 to generate a step-up voltage VCP (e.g., VCP=VPWR+5V). The charge pump 90 includes diodes 91*a* and 91*b*, capacitors 92*a* and 92*b*, a controller 93, an oscillator 94, an inverter 95, resistors 96*a* and 96*b*, a level shifter 97, and a comparator 98.

The diodes 91*a* and 91*b* is a charge and discharge switch for the capacitor 92*a* provided in the form of an external component. An anode of the diode 91*a* is connected to an application terminal of the power voltage VPWR. A cathode of the diode 91*a* and an anode of the diode 91*b* are connected to a first terminal of the capacitor 92*a*. A cathode of the diode 91*b* is connected to an application of the step-up voltage VCP. A second terminal of the capacitor 92*a* is connected to an output terminal of the inverter 95. A first terminal of the capacitor 92*b* provided in the form of an external component is connected to the application of the step-up voltage VCP. A second terminal of the capacitor 92*b* is connected to the application terminal of the power voltage VPWR.

The controller 93 operates in response to supply of the internal power supply voltage VCD, and generates a pulse signal S93 in accordance with a comparison signal S98 and a clock signal S94. Specifically, the controller 93 periodically makes the pulse signal S93 drive in synchronization with the clock signal S94. However, the controller 93 skips a pulse-drive of the pulse signal S93 in the cycle concerned, and holds the pulse signal S93 at a low level when the comparison signal S98 is at a low level at a rising timing of the clock signal S94.

The oscillator 94 operates in response to supply of the internal power supply voltage VCD, and generates the clock signal S94 of a predetermined frequency.

The inverter 95 operates in response to supply of the power voltage VPWR, and generates an inverting pulse signal S95 (high level: VPWR, low level: GND) by inverting and level-shifting the pulse signal S93.

The resistors 96*a* and 96*b* form a resistor divider which generates a divided voltage VCP' by dividing the step-up voltage VCP. As to specific connection relations, a first terminal of the resistor 96*a* is connected to the application terminal of the step-up voltage VCP. A second terminal of the resistor 96*a* and a first terminal of the resistor 96*b* are connected to an input terminal of level shifter 97. A second terminal of the resistor 96*b* is connected to the application terminal of the power voltage VPWR.

The level shifter 97 operates in response to supply of both the step-up voltage VCP and the internal power supply voltage VCD, and generates a feedback voltage VCP" from the divided voltage VCP' adapted to an input dynamic range of the comparator 98.

The comparator 98 generates the comparison signal S98 by comparing the reference voltage VREF applied to a non-inverting input terminal (+) with the feedback voltage VCP" applied to an inverting input terminal (−). The comparison signal S98 becomes a low level when the feedback voltage VCP" is higher than the reference voltage VREF, and becomes a high level when the feedback voltage VCP" is lower than the reference voltage VREF.

In the charge pump 90 in the present structural example, current flows from the application terminal of the power voltage VPWR toward the output terminal (ground terminal) of the inverter 95 via the diode 91*a* and the capacitor 92*a* when the inverting pulse signal S95 is at a low level. In the above-mentioned case, the capacitor 92*a* is charged until a voltage between two terminals of the capacitor 92*a* becomes almost same as the power voltage VPWR. When the inverting pulse signal S95 rises to a high level from the above state, the second terminal (a low potential terminal) of the capacitor 92*a* is pulled up from the ground voltage GND until the power voltage VPWR. Consequently, a voltage (2*VPWR) higher than the second terminal (VPWR) of the capacitor 92*a* by the voltage between two terminals of the capacitor 92*a* (VPWR) appears in the first terminal (a high potential terminal) of the capacitor 92*a* with the principle of conservation of charge. The capacitor 92*b* is charged by this high voltage, and the step-up voltage VCP is outputted from the first terminal of the capacitor 92*b*.

As described above, the charge pump 90 has capacity to output a step-up voltage twice as large as the power voltage at most. However, the step-up voltage is regulated in order to reduce the power consumption during normal operation, and the step-up voltage VCP is held at a voltage higher than the power voltage VPWR by a predetermined value (e.g., 5V).

The internal regulator 120 is a circuit block which generates the internal power supply voltage VLSD (e.g., 5V) for driving the lower side gate by stepping down the step-up voltage VCP, and includes an operational amplifier 121, an NMOSFET 122, resistors 123 and 124, a capacitor 125, and a diode 126. A non-inverting input terminal (+) of the operational amplifier 121 is connected to the application terminal of the reference voltage VREF. An output terminal of the operational amplifier 121 is connected to a gate of the NMOSFET 122. A first power supply terminal (a high potential terminal) of the operational amplifier 121 is connected to the application terminal of the power voltage VPWR. A second power supply terminal (a low potential terminal) of the operational amplifier 121 is connected to the ground terminal. A drain of the NMOSFET 122 is connected to a cathode of the diode 126. An anode of the diode 126 is connected to the application terminal of the step-up voltage VCP. A source and a back gate of the NMOSFET 122 are connected to an output terminal of the internal power supply voltage VLSD; moreover, they are connected to the ground terminal via the resistors 123 and 124. An inverting input terminal (−) of the operational amplifier 121 is connected to a connection node between the resistor 123 and the resistor 124. The capacitor 125 for smoothing an output is provided in the form of an external component between the output terminal of the internal power supply voltage VLSD and the ground terminal.

In the above internal regulator 120, the operational amplifier 121 generates a gate voltage of the NMOSFET 122 and adjusts a degree of conduction of the NMOSFET 122 so that the reference voltage VREF applied to the non-inverting input terminal (+) may correspond with a divided voltage VLSD' (e.g., VLSD'=VLSD/10) of the internal power supply voltage VLSD applied to the inverting input terminal (–). According to such output feedback control, the internal regulator 120 generates the internal power supply voltage VLSD (e.g., VLSD'=10*VREF=5V) in accordance with the reference voltage VREF by stepping down the step-up voltage VCP.

Here, the step-up voltage VCP is the highest voltage in the motor driver system, and is least likely to become lower than a target voltage (5V) of the internal power supply voltage VLSD before beginning to apply the final brake of the spindle motor 2 when the power supply voltage is shut down.

Therefore, the internal regulator 120 is structured so as to generate the internal power supply voltage VLSD from the step-up voltage VCP. According to such a structure, it is possible to certainly pull up the lower side gate signals xLG of the spindle motor driver 10 to turn on the lower side switches 12*x* during the final brake.

As the above-mentioned description, the power voltage VPWR becomes 0V and the step-up voltage VCP is lower than the internal power supply voltage VLSD when applying the brake to the spindle motor 2 because the power voltage VPWR is generated by rectifying the back electromotive force generated during idling of the spindle motor 2. In this situation, a backflow current path is formed from the application terminal of the internal power supply voltage VLSD toward the application terminal of the step-up voltage VCP via a body diode BD of the NMOSFET 122.

Therefore, the internal regulator 120 includes the diode 126 which is connected between the application terminal of the step-up voltage VCP and the output terminal of the internal power supply voltage VLSD as a backflow prevention element for blocking the above-mentioned backflow current path. According to such a structure, it is possible to turn on the lower side switches 12*x* for a longer time because unnecessary discharge of the capacitor 125 is avoided.

Here, the resistors 123 and 124 for the output feedback become a discharge path of the capacitor 125. Generally, it is possible to ignore a current flowing through this discharge path because their resistance values are set to very large values.

<Current Monitor>

Figure 6:
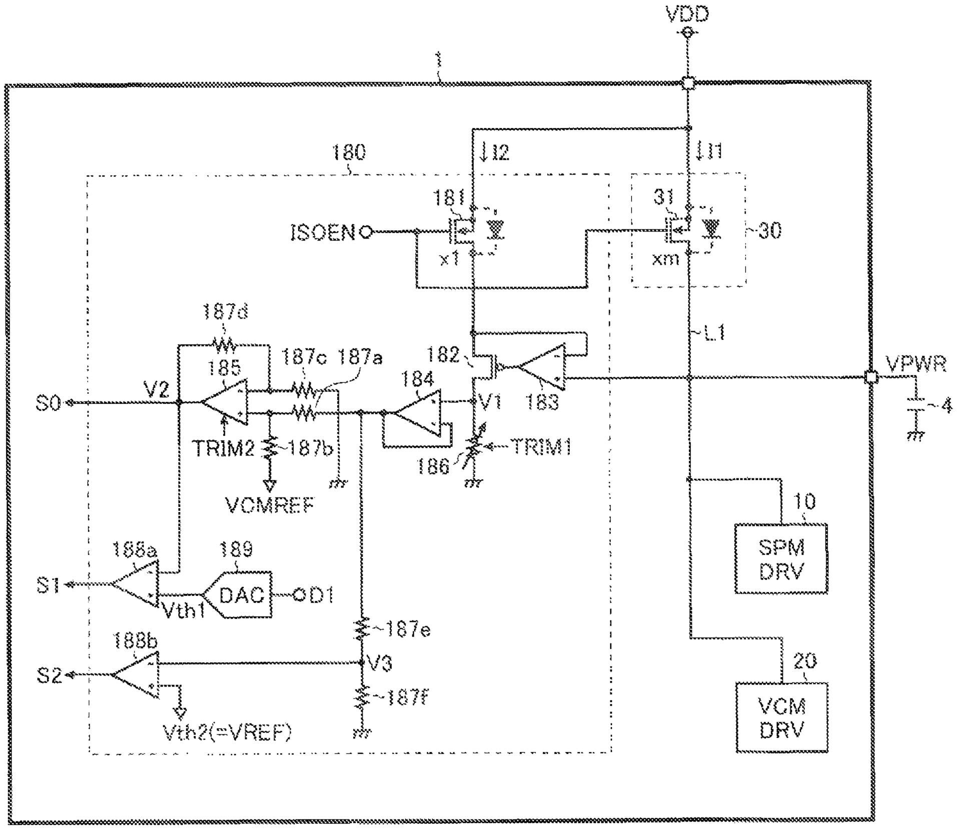
FIG. 6 is a circuit diagram showing a structural example of a current monitor 180.

FIG. 6 is a circuit diagram showing a structural example of a current monitor 180. The current monitor 180 in the present structural example is a circuit block which monitors an output terminal I1 flowing into the isolation switch 30, and includes an NMOSFET 181, a PMOSFET 182, operational amplifiers 183 to 185, a resistor 186, resistors 187*a* to 187*f*, comparators 188*a* and 188*b*, and a D/A converter 189.

The NMOSFET 181 is a mirror switch of which a gate and a back gate are connected to the application terminal of the power supply voltage VDD, and which is turned on and off by a control signal ISOEN as same as the isolation switch 30. Here, the NMOSFET 31 used as the isolation switch 30 and NMOSFET 181 used as the mirror switch are formed by the same process, and have the same temperature characteristics and the same voltage characteristics. The NMOSFET 181 is designed smaller in size (e.g., 1/5032) than the NMOSFET 31.

The PMOSFET 182 and the operational amplifier 183 form a bias generator for biasing a source of the NMOSFET 181 to the same voltage (the power voltage VPWR) as the power supply line L1. In other words, a voltage between two terminals of the NMOSFET 31 corresponds with a voltage between two terminals of the NMOSFET 181. As to specific connection relations, a source of the PMOSFET 182 is connected to the source of the NMOSFET 181. A drain of the PMOSFET 182 is connected to the ground terminal via the resistor 186. A gate of the PMOSFET 182 is connected to an output terminal of the operational amplifier 183. A non-inverting input terminal (+) of the operational amplifier 183 is connected to the power supply line L1. An inverting input terminal (–) of the operational amplifier 183 is connected to a drain of the NMOSFET 181. The operational amplifier 183 connected in this way generates a gate voltage of the PMOSFET 182 so that the drain of the NMOSFET 181 may become the same voltage (the power voltage VPWR) as the power supply line L1.

Figure 7:
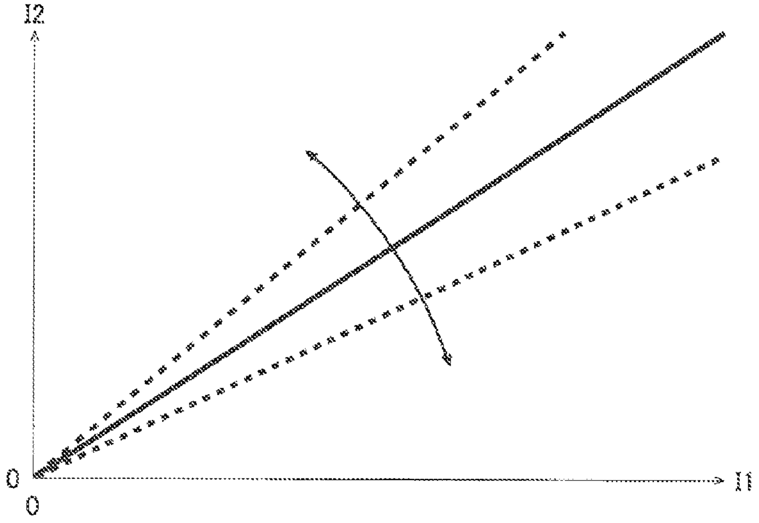
FIG. 7 is a schematic diagram showing an example of a gain trimming.

The resistor 186 (resistance value: R186) changes a monitor current I2 (=α*I11, where α<1) flowing into the NMOSFET 181 into a voltage V1 (=I2*R186). Here, the resistance value R186 of the resistor 186 is variable in accordance with a gain trim signal TRIM1. According to such a structure, as shown in FIG. 7, it is possible to revise a slope of the monitor current I2 to the output current I1.

The operational amplifier 184 functions as a buffer amplifier which outputs to the latter stage the voltage V1 inputted from a first end of the resistor 186. As to specific connection relations, a non-inverting input terminal (+) of the operational amplifier 184 is connected to an application terminal of the voltage V1. An inverting input terminal (–) of the operational amplifier 184 is connected to an output terminal of the operational amplifier 184.

The operational amplifier 185 and resistors 187*a* to 187*d* form a level shift amplifier which generates a voltage V2 by level-shifting the voltage V1. As to specific connection relations, a non-inverting input terminal (+) of the operational amplifier 185 is connected to the output terminal of the operational amplifier 184 via the resistor 187*a*; moreover, it is connected to an application terminal of a reference voltage VCMREF (e.g., 0.75V) via the resistor 187*b*. An inverting input terminal (–) of the operational amplifier 185 is connected to the ground terminal via the resistor 187*c*; moreover, it is connected to an output terminal of the operational amplifier 185 (an output terminal of the voltage V2) via the resistor 187*d*.

The voltage 2 generated by the level shift amplifier in the present structural example is outputted to the A/D converter 50 (see FIG. 1) as an analog signal SO with which a voltage value is seamlessly changed in accordance with the output current I1. In view of a dynamic range (e.g., 0V to 1.5V) of the A/D converter 50, the voltage V2 is level-shifted so as to change the voltage value based on a center value (e.g., 0.75V) of the dynamic range.

Figure 8:
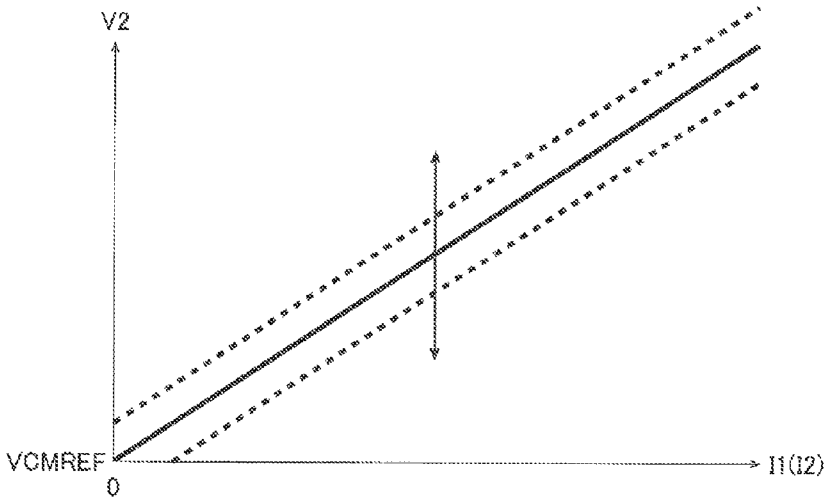
FIG. 8 is a schematic diagram showing an example of an offset trimming.

An offset value of the level shift amplifier (more specifically, the operational amplifier 185) is variable in accordance with a zero offset trim signal TRIM2. According to such a structure, as shown in FIG. 8, it is possible to revise an absolute difference of the voltage caused by a difference of a zero point.

The resistors 187*e* and 187*f* form a resistor divider which generates a voltage V3 by dividing the voltage V1. As to specific connection relations, a first terminal of the resistor 187*e* is connected to the output terminal of the operational amplifier 184. A second terminal of the resistor 187*e* and a first terminal of the resistor 187*f* are connected to a non-inverting input terminal (+) of the comparator 188*b*. A second terminal of the resistor 187*f* is connected to the ground terminal.

The comparator 188*a* generates a current limit signal S1 by comparing the voltage V2 applied to an inverting input terminal (−) with a threshold voltage Vth1 applied to a non-inverting input terminal (+). The current limit signal S1 becomes a low level when the voltage V2 is higher than the threshold voltage Vth1, and becomes high level when the voltage V2 is lower than the threshold voltage Vth1. If the voltage V2 is converted to phase currents Ix (where x=A, B, C; the same below) of the spindle motor 2, the current limit signal S1 becomes a low level (a logic level at the overcurrent detection state) when the phase currents Ix are larger than an overcurrent detection value Ith1 (the overcurrent detection value Ith1 is a variable value, e.g., 1.0 A to 2.4 A), and becomes a high level (a logic level at the overcurrent undetected state) when the phase currents Ix are smaller than the overcurrent detection value Ith1. As described above, the current limit signal S1 is used for overcurrent detection processing of the phase currents Ix. Besides, the current limit signal S1 is also used for rotor position detection processing (this details will be described later) at the time of the start-up of the spindle motor 2.

The comparator 188*b* generates a current limit signal S2 by comparing the voltage V3 applied to an inverting input terminal (−) with a threshold voltage Vth2 (=the reference voltage VREF) applied to a non-inverting input terminal (+). The current limit current S2 becomes a low level when the voltage V3 is higher than the threshold voltage Vth2, and becomes a high level when the voltage V3 is lower than the threshold voltage Vth2. If the voltage V3 is converted to the output currents I1, the current limit signal S2 becomes a low level (a logic level at the overcurrent detection state) when the output current I1 is larger than an overcurrent detection value Ith2 (the overcurrent detection value Ith2 is a fixed value in accordance with the threshold voltage V2, e.g., 4.0 A), and becomes a high level (a logic level at the overcurrent undetected state) when the output current I1 is smaller than the overcurrent detection value Ith2. As described above, the current limit signal S2 is used for overcurrent detection processing of the output current I1.

The D/A converter 189 changes a digital signal D1 (e.g., 3 bits) into the threshold voltage Vth1.

Here, latter circuit elements (the operational amplifier 184 and 185, the resistors 187*a* to 187*f*, the comparators 188*a* and 188*b*, and the D/A converter 189) than the resistor 186 form a current limit signal generator which generates the current limit signals (S1 and S2 in the present structural example) by comparing at least one of the voltages V1 to V3 with a predetermined threshold voltage.

The current monitor 180 in the present structural example is able to generate the analog signal S0 in accordance with a current value of the output current I1, the current limit signal S1 for the phase currents Ix, and the current limit signal S2 for the output current I1 in parallel by monitoring the monitor current I2 showing behavior as same as the output current I1 flowing into the isolation switch 30. Accordingly, it is possible to improve power efficiency and to reduce a circuit scale because it is unnecessary to prepare a sense resistor which is inserted in the power supply line L1 and a current detection circuit (comparator, etc.) of each phase.

Besides, it is possible to improve accuracy of the overcurrent detection of the phase currents Ix because the common overcurrent detection value Ith1 is applicable to all the phase currents Ix unlike a structure for individually monitoring the phase currents Ix, one for each phase.

A structure which generates the current limit signal S1 by monitoring the voltage V2 to which both gain trimming processing (see FIG. 7) and zero offset trimming processing (see FIG. 8) are given is illustrated with the current monitor 180 in the present structural example. However, a method of generating the current limit signal S1 is not limited to this, and it is possible to generate the current limit signal S1, for example, from the voltage V1 or the voltage V3

<Rotor Position Detection Routine>

Figure 9:
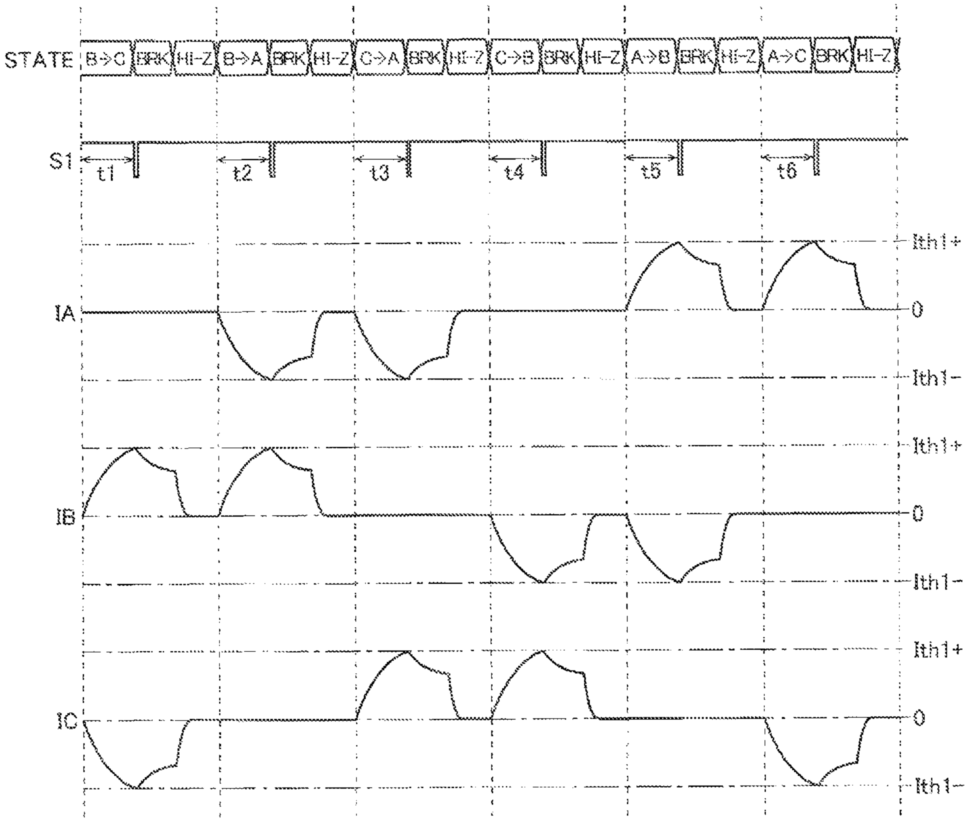
FIG. 9 is a timing chart showing an example of a rotor position detection routine.

FIG. 9 is a timing chart showing an example of a rotor position detection routine (i.e., an inductive sense routine), and describe operative condition of the spindle motor driver 10, the current limit signal S1, and the phase currents Ix (where x=A, B, C; the same below), in order from top.

The rotor position detection routine is mainly executed by the microcomputer 5. Specifically, the microcomputer 5 measures the time requested of six patterns (B→C, B→A, C→A, C→B, A→B, and A→C) from phase switching timing to the overcurrent detection (falling of the current limit signal S1) to detect a rotor position of the spindle motor 2 based on the measurement result (time t1 to t6).

According to the above-mentioned current monitor 180, it is possible to improve the accuracy of the overcurrent detection of the phase currents Ix and consequently the accuracy of the rotor position detection because the common overcurrent detection value Ith1 is applicable to all the phase currents Ix.

Here, the voice coil motor driver 20 holds the voice coil motor 3 at the suspended state until the rotor position detection processing at the time of start of the spindle motor 2 is completed. According to such a structure, it is possible to correctly detect the phase currents Ix of the spindle motor 20 and consequently to the accuracy of the rotor position detection because a drive current for the voice coil motor 3 isn't superimposed on the output current I1 flowing into the power supply line L1 during the above-mentioned the rotor position detection processing.

<Application to Hard Disk Drive>

Figure 10:
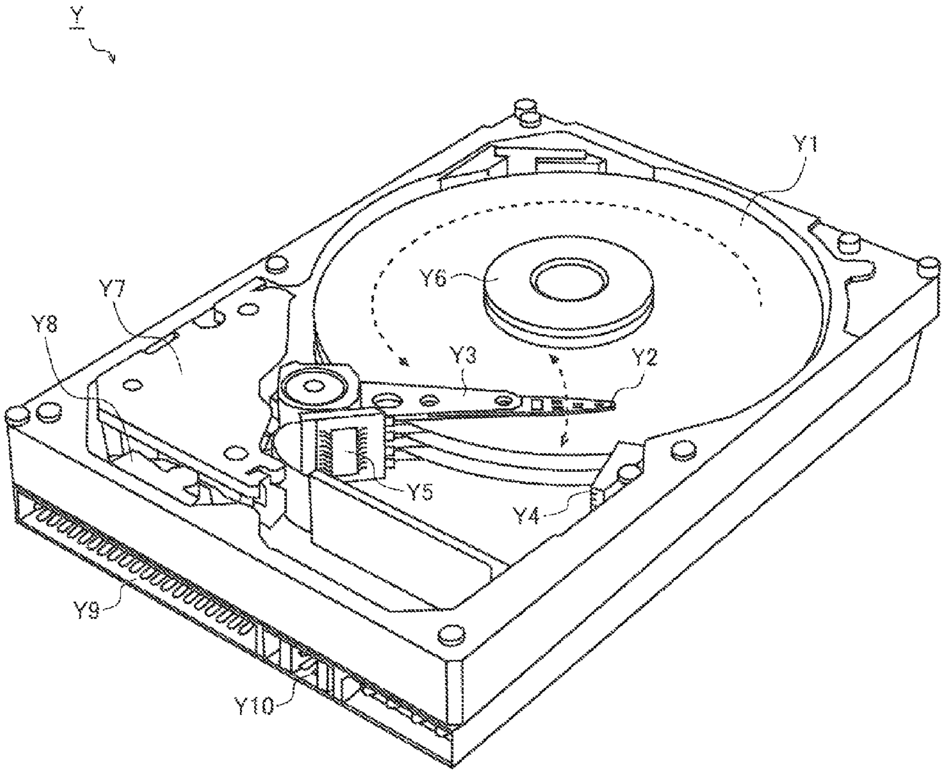
FIG. 10 is a perspective view showing a structural example of a hard disk drive provided with a motor drive device.

FIG. 10 is a perspective view (with a top cover removed) showing a structural example of a hard disk drive that incorporates the motor drive device. A hard disk drive Y in the present structural example is a kind of magnetic disk storage device and has: a platter Y1; a magnetic head Y2; a swing arm Y3; a lamp mechanism Y4; a head amplifier Y5; a spindle motor Y6; a voice coil motor Y7; a latch mechanism Y8; an interface connector Y9; and a jumper switch Y10.

The platter Y1 is a magnetic disk that is formed by laminating a magnetic layer on a surface of an aluminum board or a glass board. One hard disk drive Y incorporates one to four platters Y1.

The magnetic head Y2 reads and writes data to and from the platter Y1.

The swing arm Y3 holds the magnetic head Y2 at a tip end thereof.

The lamp mechanism Y4 is an evacuation place for the magnetic head Y2 during a time the platter Y1 does not rotate, and is disposed further outside an outermost circumference of the platter Y1.

The head amplifier Y5 amplifies a regenerative signal obtained by the magnetic head Y2.

The spindle motor Y6 (corresponding to the spindle motor 2 in FIG. 2) rotates the platter Y1 at predetermined rotation speeds (4200 rpm, 5400 rpm, 7200 rpm, 10000 rpm, 15000 rpm and the like).

The voice coil motor Y7 (corresponding to the voice coil motor 3 in FIG. 1) moves the swing arm Y3 in an arc, thereby moving the magnetic head Y2 in a radial direction of the platter Y1.

The latch mechanism Y8 holds the swing arm Y3 during a time the hard disk drive Y is stopped.

The interface connector Y9 is connected to a host interface circuit, which is mounted on a mother board of a personal computer and the like, over a cable.

The jumper switch Y10 is a switch for performing the machine setting (master/slave and the like) of the hard disk drive Y by means of a jumper pin when connecting a plurality of the hard disk drives to one personal computer.

Here, though not shown in FIG. 10, the hard disk drive Y is provided with a printed board on which the microcomputer (Soc) and various electronic circuits are mounted. The motor drive device 1 in FIG. 1 is mounted on the above-mentioned printed board as a means for driving the spindle motor Y6 and the voice coil motor Y7.

<Application to Desktop Personal Computer>

Figure 11:
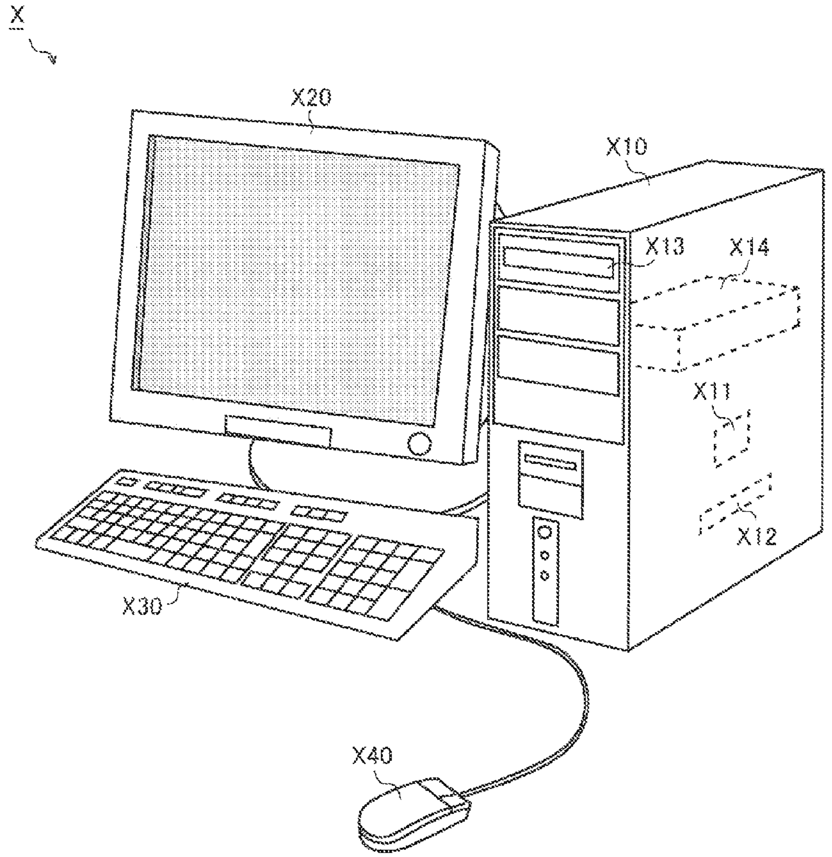
FIG. 11 is an appearance view showing a structural example of a personal computer that incorporates a hard disk drive.

FIG. 11 is an appearance view showing a structural example of a desktop personal computer that incorporates the hard disk drive. A desktop personal computer X in the present structural example has: a main body case X10; a liquid crystal monitor X20; a keyboard X30; and a mouse X40.

The main body case X10 houses: a central processing unit X11; a memory X12; an optical drive X13; a hard disk drive X14 and the like.

The central processing unit X11 executes an operating system and various application programs stored in the hard disk drive X14, thereby controlling comprehensively operation of the desktop personal computer X.

The memory X12 is used as a working region (e.g., a region for storing task data when executing a program) for the central processing unit X11.

The optical drive X13 performs reading/writing of data to and from an optical disk. As the optical disk, there are a CD [compact disk], a DVD [digital versatile disc], a BD [Blu-ray disc] and the like.

The hard disk drive X14 (corresponding to the hard disk drive Yin FIG. 10) is a large-capacity auxiliary storage device that stores the programs and data in a non-volatile way by means of a magnetic disk sealed tightly in the housing.

The liquid crystal monitor X20 outputs an image based on an instruction from the central processing unit X11.

The keyboard X30 and the mouse X40 are each a human interface device that accepts operation by a user.

SUMMARY

Hereinafter, the invention described in the specification can be summarized.

[First Invention]

In the invention described in the present specification, a motor drive device of a first invention comprises: motor driver adapted to receive a first power supply voltage to drive a motor; an internal regulator adapted to generate from an input voltage an internal power supply voltage; and a power supply switcher adapted to receive both the first power supply voltage and a second power supply voltage lower than the first power supply voltage to output, as the input voltage, the second power supply voltage when the second power supply voltage is normal and to output, as the input voltage, the first power supply voltage when the second power supply voltage is abnormal (structure 1-1).

In the motor drive device of the structure 1-1, the power supply switcher includes: a comparator which generates a comparison signal by comparing the second power supply voltage or a divided voltage of the second power supply voltage with a predetermined reference voltage, wherein the power supply switcher outputs, as the input voltage, either the first power supply voltage or the second power supply voltage in accordance with the comparison signal (structure 1-2).

In the motor drive device of the structure 1-2, the power supply switcher further includes: a backflow prevention element which is connected between an application terminal of the second power supply voltage and an application terminal of the input voltage; and a switch element which is connected between an application terminal of the first power supply voltage and the application terminal of the input voltage, wherein the switch element is turned on and off in accordance with the comparison signal (1-3 structure).

In the motor drive device of the structure 1-3, the power supply switcher further includes a level shifter which generates an on/off control signal of the switch element from the comparison signal (1-4 structure).

In the motor drive device of the structure 1-3, the backflow prevention element is a diode arranged to connect an anode of the diode to the application terminal of the second power supply voltage, and arranged to connect a cathode of the diode to the application terminal of the input voltage (1-5 structure).

In the motor drive device of the structure 1-3, the switch element is a PMOSFET arranged to connect a source of the PMOSFET to the application terminal of the first power supply voltage, and arranged to connect a drain of the PMOSFET to the application terminal of the input voltage (1-6 structure).

In the motor drive device of the structure 1-1, the internal power supply voltage is provided for relevant parts of the motor drive device as a power supply voltage for a digital system or an analog system (1-7 structure).

In the motor drive device of the structure 1-1, the internal regulator is a series regulator (1-8 structure).

In the motor drive device of the structure 1-1, the motor driver includes a spindle motor driver which drives a spindle motor; and a voice coil motor driver which drives a voice coil motor (1-9 structure).

The motor drive device of the structure 1-9 further comprises an isolation switch configured to connect and disconnect the application terminal of the first power supply voltage to and from a power supply line of the spindle motor driver and the voice coil motor driver, wherein the power supply switcher receives the first power supply voltage from the power supply line (1-10 structure).

In the motor drive device of the structure 1-10, the spindle motor driver rotates the spindle motor with the first power supply voltage when the first power supply voltage is normal, and rectifies a phase voltage generated during idling of the spindle motor to regenerate a rectified phase voltage to the power supply line when the first power supply voltage is abnormal (1-11 structure).

In the motor drive device of the structure 1-10, the voice coil motor driver drives the voice coil motor with the first power supply voltage when the first power supply voltage is normal, and drives the voice coil motor with a regenerated voltage from the spindle motor driver to the power supply line when the first power supply voltage is abnormal (1-12 structure).

A magnetic disk storage device of the first invention comprises a platter; a magnetic head which reads and writes data to and from the platter; a swing arm which holds the magnetic head at a tip end thereof; a spindle motor which rotates the platter; a voice coil motor which moves the swing arm in an arc; and a motor drive device according to the 1-12 structure which drives the spindle motor and the voice coil motor (1-13 structure).

An electronic appliance of the first invention comprises the magnetic disk storage device according to the 1-13 structure (1-14 structure).

[Second Invention]

In the invention described in the present specification, a motor drive device of a second invention comprises: a spindle motor driver adapted to drive a spindle motor, wherein the spindle motor driver includes: lower side NMOSFETs, one for each phase, which connect and disconnect terminals, one for each phase, of the spindle motor to and from a ground terminal; a controller adapted to generate a switch control signal and a brake control signal; lower side pre-drivers, one for each phase, connected between an application terminal of an internal power supply voltage and the ground terminal and adapted to generate lower side gate signals, one for each phase, in accordance with the switch control signal to output the lower side gate signals to the lower side NMOSFETs, one for each phase; and a brake unit adapted to pull up to the internal power supply voltage all the lower side gate signals, one for each phase, in accordance with the brake control signal (2-1 structure).

In the motor drive device of the structure 2-1, the controller generates the switch control signal so as to bring the lower side pre-drivers, one for each phase, to an output high impedance state when applying a brake to the spindle motor, and generates the brake control signal so as to pull up gates of the lower side NMOSFETs, one for each phase, to the internal power supply voltage (2-2 structure).

In the motor drive device of the structure 2-2, the brake unit includes: pull-up resistors, one for each phase, which is connected between the application terminal of the internal power supply voltage and the gates of the lower side NMOSFETs, one for each phase; and brake switches which connect and disconnect the application terminal of the internal power supply voltage to and from the pull-up resistors, one for each phase, in accordance with the brake control signal (2-3 structure).

In the motor drive device of the structure 2-3, the brake switches are PMOSFETs (structure 2-4).

In the motor drive device of the structure 2-4, the spindle motor driver further includes: upper side MOSFETs, one for each phase, which connect and disconnect terminals, one for each phase, of the spindle motor to and from a power supply line; and upper side pre-drivers, one for each phase, which generate upper side gate signals, one for each phase, in accordance with the switch control signal to output the upper side gate signals to the upper side MOSFETs, one for each phase (structure 2-5).

The motor drive device of the structure 2-5 further comprises an internal regulator which generates the internal power supply voltage from an input voltage, wherein an output terminal of the internal power supply voltage is connected to a capacitor for smoothing an output (structure 2-6).

In the motor drive device of the structure 2-6, the internal regulator includes a backflow prevention element which is connected between an application terminal of the input voltage and the output terminal of the internal power supply voltage (structure 2-7).

In the motor drive device of the structure 2-7, the internal regulator is not connected to a DC load when applying a brake to the spindle motor (structure 2-8).

The motor drive device of the structure 2-8 further comprises an isolation switch which connects and disconnects an application terminal of a power supply voltage to and from the power supply line, wherein the spindle motor driver rotates the spindle motor with the power supply voltage when the power supply voltage is normal, and rectifies a phase voltage generated during idling of the spindle motor to regenerate a rectified phase voltage to the power supply line when the power supply voltage is abnormal (2-9 structure).

The motor drive device of the structure 2-9 further comprises a charge pump which receives electric power from the power supply line to generate a step-up voltage, wherein the internal regulator receives the step-up voltage as the input voltage (structure 2-10).

The motor drive device of the structure 2-10 further comprises a voice coil motor driver which receives the electric power from the power supply line to drive a voice coil motor (structure 2-11).

In the motor drive device of the structure 2-11, the voice coil motor driver drives the voice coil motor with the power supply voltage when the power supply voltage is normal, and drives the voice coil motor with a regenerated voltage from the spindle motor driver to the power supply line when the power supply voltage is abnormal (structure 2-12).

A magnetic disk storage device of the second invention comprises a platter; a magnetic head which reads and writes data to and from the platter; a swing arm which holds the magnetic head at a tip end thereof; a spindle motor which rotates the platter; a voice coil motor which moves the swing arm in an arc; and a motor drive device according to the 2-12 structure which drives the spindle motor and the voice coil motor (2-13 structure).

An electronic appliance of the second invention comprises the magnetic disk storage device according to the 2-13 structure (2-14 structure).

[Third Invention]

In the invention described in the present specification, a motor drive device of a third invention comprises: a spindle motor driver adapted to receive electric power from a power supply line to drive a spindle motor; an isolation switch adapted to connect and disconnect an application terminal of a power supply voltage to and from the power supply line; and a current monitor adapted to monitor a first current flowing into the isolation switch, wherein the current monitor includes a mirror switch arranged to connect a first terminal of the mirror switch to the application terminal of the power supply voltage and adapted to be turned on and off by the same control signal as the isolation switch; a bias generator adapted to bias a second terminal of the mirror switch to the same voltage as the power supply line; a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal (structure 3-1).

In the motor drive device of the structure 3-1, the isolation switch and the mirror switch are NMOSFETs formed by the same process (structure 3-2).

In the motor drive device of the structure 3-1, the mirror switch is smaller in size than the isolation switch (structure 3-3).

In the motor drive device of the structure 3-1, a resistance value of the resistor is variable (structure 3-4).

In the motor drive device of the structure 3-1, the bias generator includes a PMOSFET which is connected between a second terminal of the mirror switch and the resistor; and an operational amplifier which generates a gate voltage of the PMOSFET so that the second terminal of the mirror switch may become the same voltage as the power supply line (structure 3-5).

In the motor drive device of the structure 3-1, the current limit signal generator includes a buffer amplifier which outputs to the latter stage the first voltage inputted from the resistor (structure 3-6).

In the motor drive device of the structure 3-1, the current limit signal generator includes a level shift amplifier which generates the second voltage by level-shifting the first voltage (structure 3-7).

In the motor drive device of the structure 3-7, an offset value of the level shift amplifier is variable (structure 3-8).

The motor drive device of the structure 3-1 further comprises: a logic unit which controls entire operation of the motor drive device; and an A/D converter which converts an analog signal into a digital signal to output the digital signal to the logic unit, wherein the second voltage is outputted to the A/D converter (structure 3-9).

In the motor drive device of the structure 3-1, the current limit signal generator includes a first comparator which compares the second voltage with a first threshold voltage to generate a first current limit signal (structure 3-10).

In the motor drive device of the structure 3-10, the current limit signal generator further includes a D/A converter which converts a digital signal into the first threshold voltage (structure 3-11).

In the motor drive device of the structure 3-11, the first current limit signal is used for at least one of overcurrent detection processing and rotor position detection processing (structure 3-12).

In the motor drive device of the structure 3-10, the current limit signal generator further includes a resistor divider which generates the third voltage by dividing the first voltage; and a second comparator which generates a second current limit signal by comparing the third voltage with a second threshold voltage (structure 3-13).

In the motor drive device of the structure 3-13, the second current limit signal is used for overcurrent detection processing (structure 3-14).

The motor drive device of the structure 3-1 further comprises a voice coil motor driver which receives electric power from the power supply line to drive a voice coil motor, wherein the voice coil motor driver holds the voice coil motor at the suspended state until rotor position detection processing at the time of start of the spindle motor is completed (structure 3-15).

A magnetic disk storage device of the second invention comprises a platter; a magnetic head which reads and writes data to and from the platter; a swing arm which holds the magnetic head at a tip end thereof; a spindle motor which rotates the platter; a voice coil motor which moves the swing arm in an arc; and a motor drive device according to the 3-15 structure which drives the spindle motor and the voice coil motor (3-16 structure).

An electronic appliance of the third invention comprises the magnetic disk storage device according to the 3-16 structure (3-17 structure).

<Other Modifications>

In the above embodiments, a hard disk drive is given as an example of applications which incorporate the motor drive device. Besides, it is possible to incorporate the motor drive device into the applications other than the hard disk drive.

In addition, in the above embodiments, a desktop personal computer is given as an example of electronic appliance which incorporates the hard disk drive. Besides, it is possible to incorporate the hard disk drive into the electronic appliance (laptop computers, tablet personal computers, hard disk recorders, audio players, game machines and the like) other than the desktop personal computer.

Besides, in addition to the above embodiments, it is possible to add various modifications to the invention disclosed in the present specification without departing the spirit of the technological creation. In other words, it should be understood that the above embodiments are examples in all respects and are not limiting, the technological scope of the present invention is not indicated by the above embodiments but by the claims, and all modifications within the scope of the claims and the meaning equivalent to the claims are covered.

INDUSTRIAL APPLICABILITY

The invention disclosed in the present specification is usable, for example, as a system motor driver LSI for a HDD [hard disk drive] controller.

What is claimed is:

1. A motor drive device comprising:

a spindle motor driver adapted to receive electric power from a power supply line to drive a spindle motor;

an isolation switch adapted to connect and disconnect an application terminal of a power supply voltage to and from the power supply line; and a current monitor adapted to monitor a first current flowing into the isolation switch, wherein fixed. esthe current monitor comprises:

a mirror switch arranged to connect a first terminal of the mirror switch to the application terminal of the power supply voltage and adapted to be turned on and off by the same control signal as the isolation switch;

a bias generator adapted to bias a second terminal of the mirror switch to the same voltage as the power supply line;

a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal;

wherein a resistance value of the resistor is variable.

2. The motor drive device according to claim 1, wherein the isolation switch and the mirror switch are NMOSFETs formed by the same process.

3. The motor drive device according to claim 1, wherein the mirror switch is smaller in size than the isolation switch.

4. The motor drive device according to claim 1, wherein the bias generator comprises:

a PMOSFET which is connected between a second terminal of the mirror switch and the resistor; and an operational amplifier which generates a gate voltage of the PMOSFET so that the second terminal of the mirror switch may become the same voltage as the power supply line.

5. The motor drive device according to claim 1, wherein the current limit signal generator includes:

a buffer amplifier which outputs to a latter stage the first voltage inputted from the resistor.

6. A motor drive device comprising:

a spindle motor driver adapted to receive electric power from a power supply line to drive a spindle motor;

an isolation switch adapted to connect and disconnect an application terminal of a power supply voltage to and from the power supply line; and a current monitor adapted to monitor a first current flowing into the isolation switch, wherein the current monitor comprises:

a mirror switch arranged to connect a first terminal of the mirror switch to the application terminal of the power supply voltage and adapted to be turned on and off by the same control signal as the isolation switch;

a bias generator adapted to bias a second terminal of the mirror switch to the same voltage as the power supply line;

a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal;

wherein the current limit signal generator comprises:

a level shift amplifier which generates the second voltage by level-shifting the first voltage.

7. The motor drive device according to claim 6, wherein an offset value of the level shift amplifier is variable.

8. A motor drive device comprising:

a spindle motor driver adapted to receive electric power from a power supply line to drive a spindle motor;

an isolation switch adapted to connect and disconnect an application terminal of a power supply voltage to and from the power supply line; and a current monitor adapted to monitor a first current flowing into the isolation switch, wherein the current monitor comprises:

a mirror switch arranged to connect a first terminal of the mirror switch to the application terminal of the power supply voltage and adapted to be turned on and off by the same control signal as the isolation switch;

a bias generator adapted to bias a second terminal of the mirror switch to the same voltage as the power supply line;

a resistor which converts a second current flowing into the mirror switch into a first voltage;

a current limit signal generator adapted to compare at least one of the first voltage, a second voltage obtained by level-shifting the first voltage, and a third voltage obtained by dividing the first voltage with a predetermined threshold voltage to generate a current limit signal;

a logic unit which controls entire operation of the motor drive device; and an A/D converter which converts an analog signal into a digital signal to output the digital signal to the logic unit, wherein the second voltage is outputted to the A/D converter.

9. A motor drive device comprising:

a spindle motor driver adapted to receive electric power from a power supply line to drive a spindle motor;

an isolation switch adapted to connect and disconnect an application terminal of a power supply voltage to and from the power supply line; and a current monitor adapted to monitor a first current flowing into the isolation switch, wherein the current monitor comprises:

a mirror switch arranged to connect a first terminal of the mirror switch to the application terminal of the power supply voltage and adapted to be turned on and off by the same control signal as the isolation switch;

a bias generator adapted to bias a second terminal of the mirror switch to the same voltage as the power supply line;

a resistor which converts a second current flowing into the mirror switch into a first voltage; and a current limit signal generator adapted to compare at least one of the first voltage, a second voltage obtained by level-shifting the first voltage, and a third voltage obtained by dividing the first voltage with a predetermined threshold voltage to generate a current limit signal;

wherein the current limit signal generator comprises:

a first comparator which compares the second voltage with a first threshold voltage to generate a first current limit signal.

10. The motor drive device according to claim 9, wherein the current limit signal generator further includes:

a D/A converter which converts a digital signal into the first threshold voltage.

11. The motor drive device according to claim 10, wherein the first current limit signal is used for at least one of overcurrent detection processing and rotor position detection processing.

12. The motor drive device according to claim 9, wherein the current limit signal generator further includes:

a resistor divider which generates the third voltage by dividing the first voltage; and a second comparator which generates a second current limit signal by comparing the third voltage with a second threshold voltage.

13. The motor drive device according to claim 12, wherein the second current limit signal is used for overcurrent detection processing.

14. A motor drive device comprising:

a spindle motor driver adapted to receive electric power from a power supply line to drive a spindle motor;

an isolation switch adapted to connect and disconnect an application terminal of a power supply voltage to and from the power supply line; and a current monitor adapted to monitor a first current flowing into the isolation switch, wherein the current monitor comprises:

a mirror switch arranged to connect a first terminal of the mirror switch to the application terminal of the power supply voltage and adapted to be turned on and off by the same control signal as the isolation switch;

a bias generator adapted to bias a second terminal of the mirror switch to the same voltage as the power supply line;

a resistor which converts a second current flowing into the mirror switch into a first voltage;

a current limit signal generator adapted to compare at least one of the first voltage, a second voltage obtained by level-shifting the first voltage, and a third voltage obtained by dividing the first voltage with a predetermined threshold voltage to generate a current limit signal; and a voice coil motor driver which receives electric power from the power supply line to drive a voice coil motor, wherein the voice coil motor driver holds the voice coil motor at the suspended state until rotor position detection processing at the time of start of the spindle motor is completed.

15. A magnetic disk storage device comprising:

a platter;

a magnetic head which reads and writes data to and from the platter;

a swing arm which holds the magnetic head at a tip end thereof;

a spindle motor which rotates the platter;

a voice coil motor which moves the swing arm in an arc; and a motor drive device according to claim 14, which drives the spindle motor and the voice coil motor.

16. An electronic appliance comprising:

the magnetic disk storage device according to claim 15.

* * * * *